United States Patent
Lee et al.

(10) Patent No.: US 12,382,532 B2
(45) Date of Patent: Aug. 5, 2025

(54) METHOD AND DEVICE FOR ADAPTING LINK OF V2X COMMUNICATION SYSTEM

(71) Applicant: UIF (University Industry Foundation), Yonsei University, Seoul (KR)

(72) Inventors: Chung Yong Lee, Seoul (KR); Kyu Yeon Lee, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 585 days.

(21) Appl. No.: 17/807,087

(22) Filed: Jun. 15, 2022

(65) Prior Publication Data

US 2023/0037030 A1    Feb. 2, 2023

(30) Foreign Application Priority Data

Jul. 19, 2021 (KR) .................. 10-2021-0094161
May 19, 2022 (KR) .................. 10-2022-0061454

(51) Int. Cl.
  *H04W 4/00*   (2018.01)
  *H04L 1/00*   (2006.01)
  *H04L 1/20*   (2006.01)
  *H04W 4/02*   (2018.01)
  *H04W 4/40*   (2018.01)
  *H04W 76/23*  (2018.01)

(52) U.S. Cl.
  CPC .......... *H04W 76/23* (2018.02); *H04L 1/0003* (2013.01); *H04L 1/203* (2013.01); *H04W 4/027* (2013.01); *H04W 4/40* (2018.02)

(58) Field of Classification Search
  None
  See application file for complete search history.

(56) References Cited

U.S. PATENT DOCUMENTS

| | | | |
|---|---|---|---|
| 2014/0307645 A1 | 10/2014 | Ji et al. | |
| 2016/0204844 A1* | 7/2016 | Sandberg | H04B 7/0486 370/252 |
| 2020/0007247 A1 | 1/2020 | Gulati et al. | |
| 2021/0376968 A1* | 12/2021 | Zhang | H04L 5/0055 |
| 2023/0403573 A1* | 12/2023 | Rydén | H04W 24/04 |
| 2024/0314638 A1* | 9/2024 | Soldati | H04B 7/0632 |

OTHER PUBLICATIONS

Office Action for KR 10-2022-0061454 by Korean Intellectual Property Office dated Mar. 13, 2024.

* cited by examiner

*Primary Examiner* — Abdelillah Elmejjarmi
(74) *Attorney, Agent, or Firm* — BROADVIEW IP LAW, PC

(57) ABSTRACT

According to the exemplary embodiment of the present disclosure, the method and the device for adapting a link of a V2X communication system acquires an appropriate parameter value to efficiently perform the link adaptation in the V2X communication system, thereby improving an average data transfer rate, determines an MCS level based on the state value (effective SNR) acquired in consideration of the device movement speed to build a V2X communication system which adaptively operates according to the state of the device.

4 Claims, 9 Drawing Sheets

100

METHOD AND DEVICE FOR ADAPTING LINK OF V2X COMMUNICATION SYSTEM

CROSS-REFERENCE TO RELATED APPLICATIONS

This application is based on and claims priority under 35 U.S.C. 119 to Korean Patent Application No. 10-2021-0094161 filed in the Korean Intellectual Property Office on Jul. 19, 2021, and Korean Patent Application No. 10-2022-0061454 filed in the Korean Intellectual Property Office on May 19, 2022, the entire contents of which are herein incorporated by reference in its entirety.

BACKGROUND

Field

The present disclosure relates to a method and a device for adapting a link for a V2X communication system, and more particularly, to a method and a device for performing link adaptation to determine a transmitting and receiving technique according to a quality of a wireless link. The link adaptation technique of the present disclosure is a technique for adaptively adjusting a link with a vehicle and a roadside base station according to a movement situation of a vehicle, specifically, semi-autonomous driving and autonomous driving vehicles.

Description of the Related Art

In a wireless channel used in a wireless communication system, an attenuation of radio waves varies according to a distance between a base station and a terminal and a shadowing effect. A link adaptation technique for increasing a throughput of a wireless channel by adjusting a modulation and coding scheme (MCS) level in accordance with a change in a reception SNR (signal to noise ratio) according to a statue change of the wireless channel is being used.

SUMMARY

An object to be achieved by the present disclosure is to provide a method and a device for adapting a link of a V2X communication system which acquire an appropriate parameter value to efficiently perform link adaptation in a V2X communication system.

Other and further objects of the present invention which are not specifically described can be further considered within the scope easily deduced from the following detailed description and the effect.

In order to achieve the above-described objects, according to an aspect of the present disclosure, a link adapting method of a V2X communication system is a link adapting method performed by a link adapting device which performs link adaptation based on information received from another link adapting device which is a communication target including: receiving device state information from another link adapting device; and performing link adaptation with the other link adapting device based on the device state information.

Here, the link adapting method is performed by a processor mounted in a first vehicle, the other link adapting device is a second vehicle or a roadside base station terminal which is located in the vicinity of the first vehicle, the device state information includes relative movement information according to relation motion between the first vehicle and the second vehicle or the load side base station terminal, and the link adaptation is performed to determine a step size to adjust a level of a modulation and coding scheme (MCS) for link adaptation using the relative movement information.

Here, in performing of link adaptation, the link adaptation is performed by adjusting a modulation and coding scheme (MCS) based on the device state information.

Here, in the performing of link adaptation, the link adaptation is performed by acquiring the MCS level which satisfies a predetermined target block error rate (BLER) based on the device state information.

Here, in the performing of link adaptation, the link adaptation is performed by acquiring the MCS level which satisfies the target block error rate (BLER) from a state value acquired based on the device state information.

Here, in the performing of link adaptation, the state value is acquired using an offset value acquired based on response information received from the link adapting device which is the communication target.

Here, in the performing of link adaptation, the offset value is acquired using a weight value acquired based on the device state information.

Here, in the performing of link adaptation, device movement speed information is acquired based on the device state information and the weight value is acquired using the device movement speed information.

Here, in the performing of link adaptation, the weight value is acquired using device movement speed information based on a predetermined weight table for every speed.

Here, the weight value is acquired using the device movement speed information based on a predetermined maximum speed.

In order to achieve the above-described objects, according to an aspect of the present disclosure, a link adapting method of a V2X communication system is a link adapting method performed by a link adapting device which transmits information to another link adapting device which is a communication target and perform the link adaptation including: acquiring device state information; transmitting the device state information to another link adapting device; and receiving result information of link adaptation performed based on the device state information from another link adapting device.

Here, the device state information includes movement speed data or data used to acquire a movement speed.

In order to achieve the above-described objects, according to an aspect of the present disclosure, a link adapting device of a V2X communication system is a link adapting device which performs link adaptation based on information received from another link adapting device which is a communication target including: a RF transceiver which transmits/receives a RF signal; a memory which stores one or more programs to perform the link adaptation; and one or more processors which perform an operation for the link adaptation according to one or more programs stored in the memory, the processor receives device state information from another link adapting device by means of the RF transceiver and performs link adaptation with the other link adapting device based on the device state information.

In order to achieve the above-described objects, according to an aspect of the present disclosure, a link adapting device of a V2X communication system is a link adapting device which transmits information to another link adapting device which is a communication target and perform the link adaptation including: a RF transceiver which transmits/receives a RF signal; a memory which stores one or more programs to perform the link adaptation; and one or more processors which perform an operation for the link adaptation according to one or more programs stored in the memory, the processor acquires device state information, transmits the device state information to another link adapting device by means of the RF transceiver, and receives result information of link adaptation performed based on the device state information from another link adapting device by means of the RF transceiver.

According to the exemplary embodiment of the present disclosure, the method and the device for adapting a link of a V2X communication system acquire an appropriate parameter value to efficiently perform link adaptation in the V2X communication system, thereby improving an average data transfer rate.

Further, according to the present disclosure, it is possible to build a V2X communication system which adaptively operates in accordance with the state of the device by determining an MCS level based on a state value (an effective SNR) acquired in consideration of a moving speed of the device.

The effects of the present invention are not limited to the technical effects mentioned above, and other effects which are not mentioned can be clearly understood by those skilled in the art from the following description

DETAILED DESCRIPTION OF THE EMBODIMENT

Figure 1:
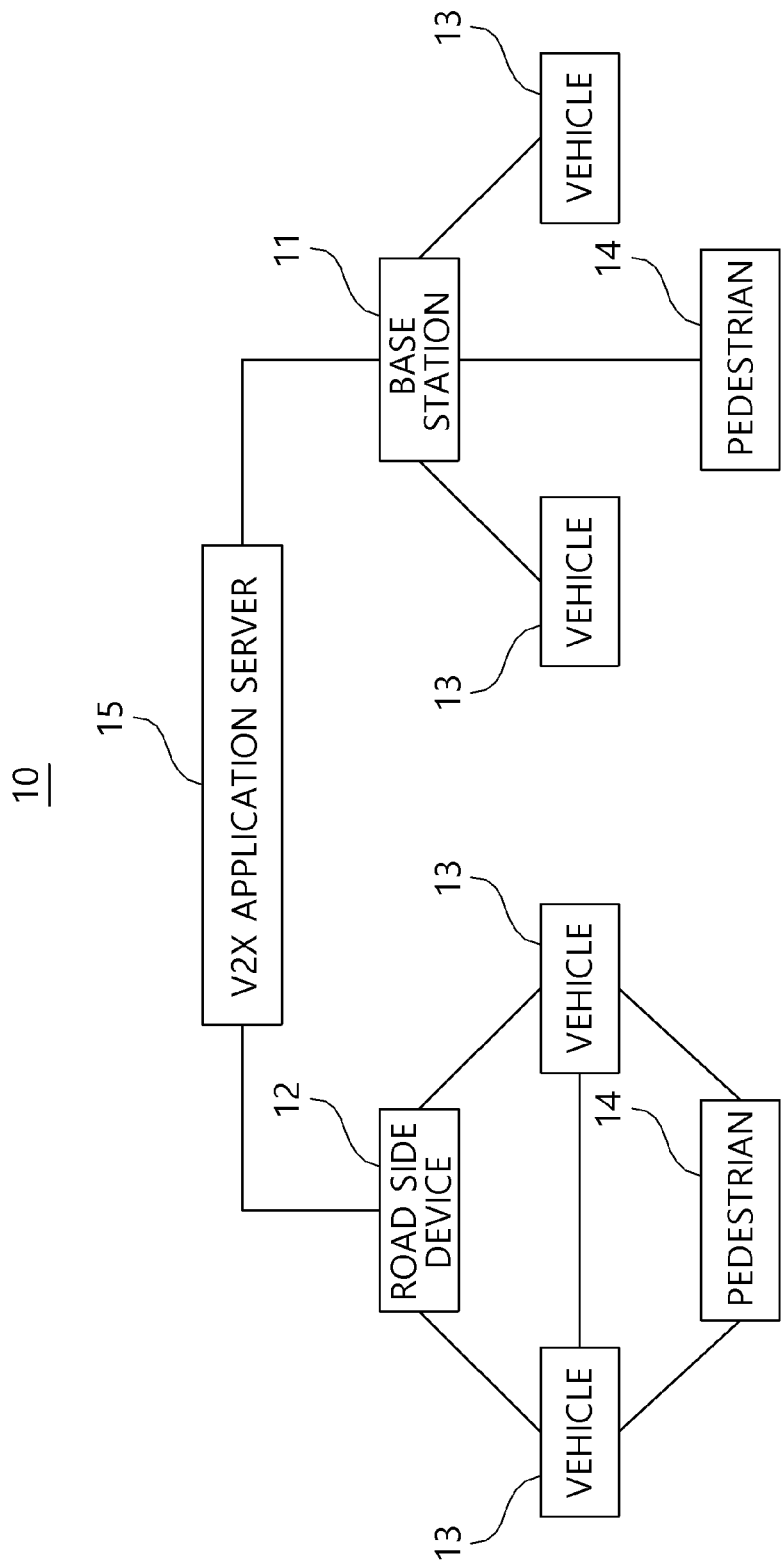
FIG. 1 is a block diagram for explaining an example of a configuration of a V2X communication system according to an exemplary embodiment of the present disclosure.

Hereinafter, embodiments of the present disclosure will be described in detail with reference to the accompanying drawings. Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may also be referred to as a second component and likewise, the second component may also be referred to as the first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

Hereinafter, an exemplary embodiment of a method and a device for adapting a link of a V2X communication system according to the present disclosure will be described in detail with reference to the accompanying drawings.

First, a V2X communication system according to an exemplary embodiment of the present disclosure will be described with reference to FIG. 1.

FIG. 1 is a block diagram for explaining an example of a configuration of a V2X communication system according to an exemplary embodiment of the present disclosure.

Referring to FIG. 1, a vehicle to everything (V2X) communication system 10 according to the exemplary embodiment of the present disclosure refers to a communication system which exchanges various information generated on the road between vehicles 13 or between the vehicle 13 and other communication devices 11, 12, 13, and 14, in accordance with the development of an intelligent traffic system.

The V2X communication system 10 may be divided into vehicle to vehicle (V2V), vehicle to pedestrian (V2P), vehicle to infrastructure (V2I), and vehicle to network (V2N) depending on a subject that exchanges information with the vehicle 13.

In order to build the V2X communication system 10 having various types of interfaces as described above, a device to device communication system that does not go through the base station 110 is essential. To this end, in 5G new radio (NR) standard, a side link technique is supported.

Accordingly, the V2X message according to the V2X communication system 10 may be transmitted through a device-to-device direct communication interface or a device-to-network communication interface. For example, a device such as a vehicle 13 or a pedestrian 14 may perform the V2X communication with the other device such as a road side unit (RSU) 12, the vehicle 13, and the pedestrian 14 using the device-to-device direct communication interface. The device, such as a vehicle 13 or a pedestrian 14, may perform the V2X communication with the network such as the base station 11 using the device-to-network communication interface. Here, the device-to-device direct communication interface may be PC5. The device-to-network communication interface may be Uu.

Here, the vehicle 13 refers to a terminal which is detachably mounted on a transportation unit which is movable on the ground or in the air by means of its own power or a power supplied from the outside or a built-in terminal. The transportation unit includes four-wheeled vehicles such as a passenger car or a van, a two-wheeled vehicle such as a motorcycle, and an aerial vehicle such as a drone.

The pedestrian 14 refers to a terminal carried by a pedestrian who boards on the vehicle or moves on the ground.

The road side unit 12 refers to a device installed on the ground or in the air to maintain a traffic order. An example of the road side unit 12 is a signal light.

The V2X application server 15 transmits/receives the V2X message with a device such as the vehicle 13 or the pedestrian 14 via the base station 11.

Now, an example of the device-to-device direct communication interface according to an exemplary embodiment of the present disclosure will be described with reference to FIG. 2.

Figure 2:
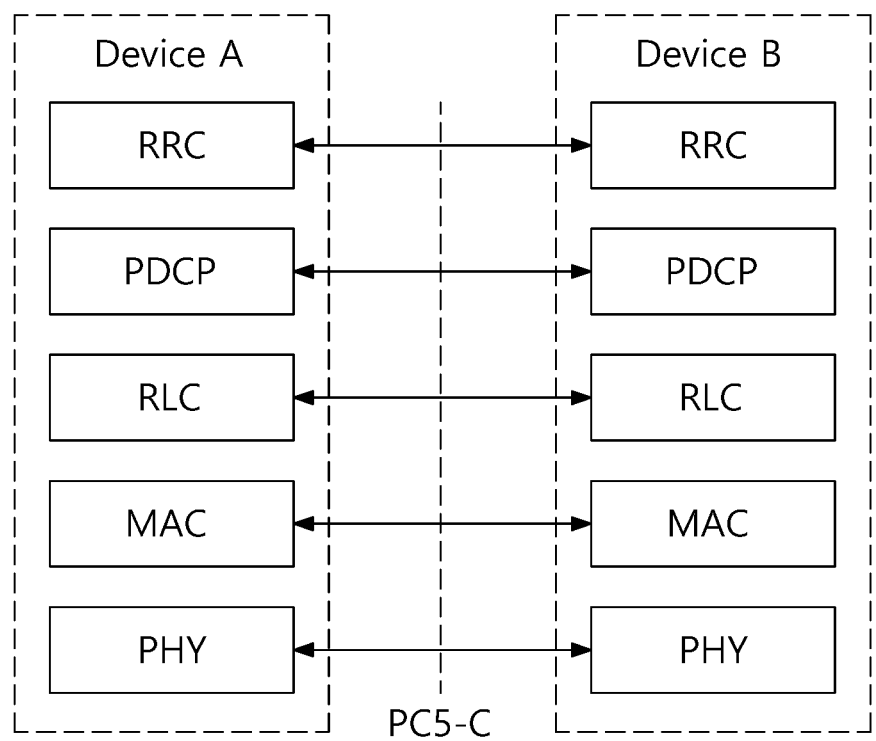
FIG. 2 is a view for explaining an example of a control plane of a device-to-device direct communication interface illustrated in FIG. 1.
Figure 3:
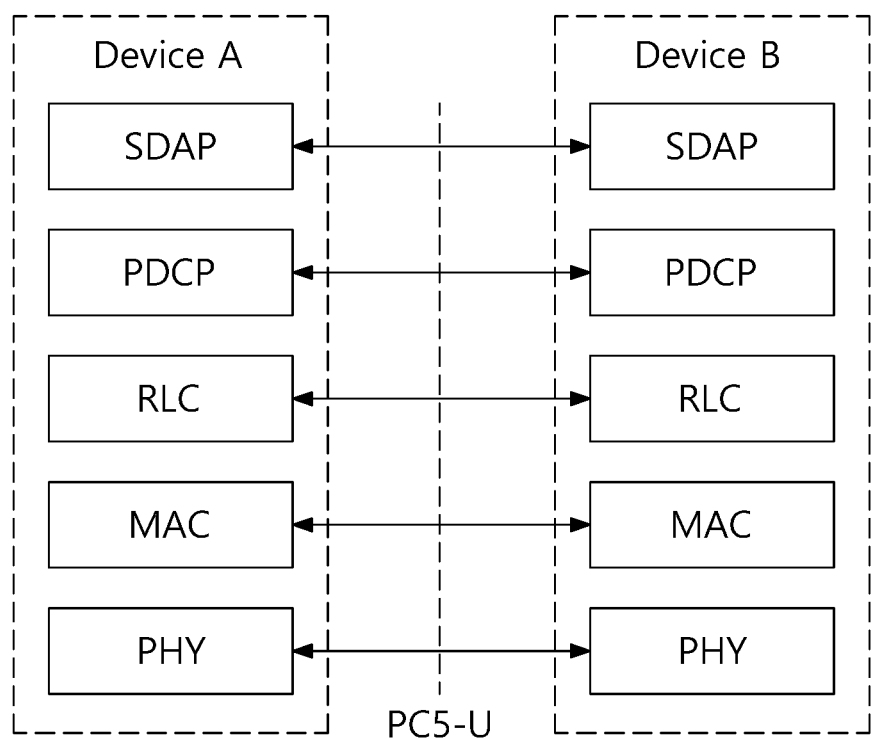
FIG. 3 is a view for explaining an example of a user plane of a device-to-device direct communication interface illustrated in FIG. 1.

FIG. 2 is a view for explaining an example of a control plane of a device-to-device direct communication interface illustrated in FIG. 1 and FIG. 3 is a view for explaining an example of a user plane of a device-to-device direct communication interface illustrated in FIG. 1.

Referring to FIG. 2, a wireless interface protocol structure on a control plane of PC2 which is one of a device-to-device direct communication interface may be configured by five layers in which a physical (PHY) layer, a medium access control (MAC) layer, a radio link control (RLC) layer, a packet data convergence protocol (PDCP) layer, and a radio resource control (RRC) layer are hierarchically formed.

Referring to FIG. 3, a wireless interface protocol structure on a user plane of PC2 which is one of a device-to-device direct communication interface may be configured by five layers in which a physical (PHY) layer, a medium access control (MAC) layer, a radio link control (RLC) layer, a packet data convergence protocol (PDCP) layer, and a service data adaptation protocol (SDAP) layer are hierarchically formed.

Here, the "PHY" layer is a layer which processes a physical channel such as a physical sidelink broadcast channel (PSBCH), a physical sidelink control channel (PSCCH), a physical sidelink shared channel (PSSCH), or a physical sidelink feedback channel (PSFCH) and a signal such as a sidelink synchronization signal (SLSS).

The "MAC" layer is a layer which performs Layer 2 packet filtering, side carrier/resource selection for broadcast, logic channel prioritization.

The "RLC" layer is a layer which performs transmission of higher layer protocol data unit (PDU), segmentation and reassembling of a RLC service data unit (SDU), and discarding of RLC SDU.

The "PDCP" layer is a layer which performs sidelink packet duplication, discarding of duplicated PDU, and timer-based SDU discarding.

The "SDAP" layer is a layer which performs quality of service (QoS) flow to sidelink radio bearer (SLRB) mapping for side unicast.

Now, a link adapting device for a V2X communication system according to an exemplary embodiment of the present disclosure will be described with reference to FIG. 4.

Figure 4:
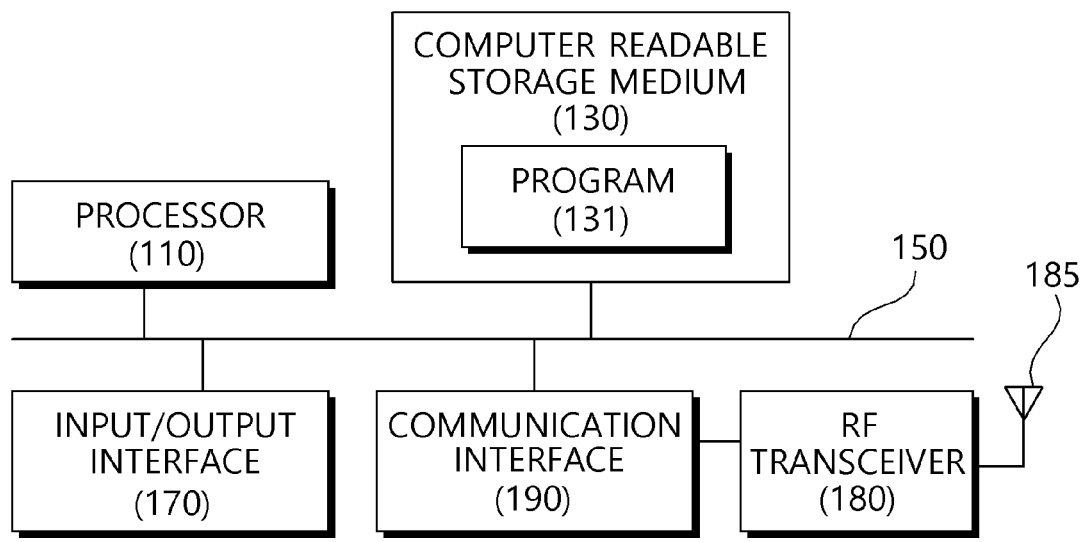
FIG. 4 is a block diagram for explaining an example of a link adapting device of a V2X communication system according to an exemplary embodiment of the present disclosure.

FIG. 4 is a block diagram for explaining an example of a link adapting device of a V2X communication system according to an exemplary embodiment of the present disclosure.

Referring to FIG. 4, a link adapting device 100 of a V2X communication system according to an exemplary embodiment of the present disclosure (hereinafter, referred to as a link adapting device) may perform link adaptation to determine a transmission/reception technique according to a quality of the wireless link.

That is, the link adapting device 100 according to the present disclosure may acquire an appropriate parameter value to efficiently perform the link adaptation in the V2X communication system 10. Here, the link adapting device 100 may be a device such as a base station 11, a load side unit 12, a vehicle 13, and a pedestrian 14.

To this end, the link adapting device 100 may include one or more processor 110, a computer readable storage medium 130, and a communication bus 150.

The processor 110 controls the link adapting device 100 to operate. For example, the processor 110 may execute one or more programs 131 stored in the computer readable storage medium 130. One or more programs 131 include one or more computer executable instructions and when the computer executable instruction is executed by the processor 110, the computer executable instruction may be configured to allow the link adapting device 100 to perform an operation for link adaptation. The computer readable storage medium 130 is configured to store a computer executable instruction or program code, program data and/or other appropriate format of information to perform link adaptation. The program 131 stored in the computer readable storage medium 130 includes a set of instructions executable by the processor 110. In one exemplary embodiment, the computer readable storage medium 130 may be a memory (a volatile memory such as a random access memory, a non-volatile memory, or an appropriate combination thereof), one or more magnetic disk storage devices, optical disk storage devices, flash memory devices, and another format of storage mediums which is accessed by the link adapting device 100 and stores desired information, or an appropriate combination thereof.

The communication bus 150 interconnects various other components of the link adapting device 100 including the processor 110 and the computer readable storage medium 130 to each other.

The link adapting device 100 may include one or more input/output interfaces 170 and one or more communication interfaces 190 which provide an interface for one or more input/output devices. The input/output interface 170 and the communication interface 190 are connected to the communication bus 150. The input/output device (not illustrated) may be connected to the other components of the link adapting device 100 by means of the input/output interface 170.

The RF transceiver 180 may be connected to the other components of the link adapting device 100 by means of the communication interface 190. The RF transceiver 180 may receive an incoming RF signal (radio frequency signal) such as a signal transmitted by the other link adapting device 100, such as the base station 11, the road side unit 12, the vehicle 13, and the pedestrian 14, by means of the antenna 185. The RF transceiver 180 may down-convert the incoming RF signal to generate an intermediate frequency signal (IF signal) or a baseband signal. When the RF transceiver 180 provides an IF signal or a baseband signal to the processor 110 via the communication interface 190, the processor 110 performs signal processing, such as filtering, decoding, or binarization, on the IF signal or the baseband signal and performs a related operation using the signal-processed data. When the IF signal or the baseband signal obtained by performing a signal processing such as encoding, multiplexing, or binarization on analog data or digital data is provided from the processor 110 via the communication interface 190, the RF transceiver 180 up-converts the IF signal or the baseband signal to the RF signal by means of the antenna 185.

Hereinafter, with respect to transmission/reception of device state information, a link adapting device 100 which transmit the device state information is referred to as a "transmission link adapting device 100-A" and a link adapting device 100 which receives the device state information to perform the link adaptation is referred to as a "reception link adapting device 100-B" to describe the link adapting method of a V2X communication system 10 according to the present disclosure hereinafter.

Here, the transmission link adapting device 100-A transmits the device state information to the other link adapting device 100 which performs link adaptation as a communication target, that is, the reception link adapting device 100-B. The transmission link adapting device 100-A may be a device such as a vehicle 13 or a pedestrian 14 which is not fixed to a specific location and is movable.

The reception link adapting device 100-B performs the link adaption based on information received from the other link adapting device 100 which is a communication target, that is, the transmission link adapting device 100-A. The reception link adapting device 100-B may be a device which is fixed to a specific location, such as the base station 11 or the road side unit 12 or a device such as a vehicle 13 or a pedestrian 14 which is not fixed to a specific location and is movable.

Now, a link adapting method for a V2X communication system according to an exemplary embodiment of the present disclosure will be described with reference to FIG. 5.

Figure 5:
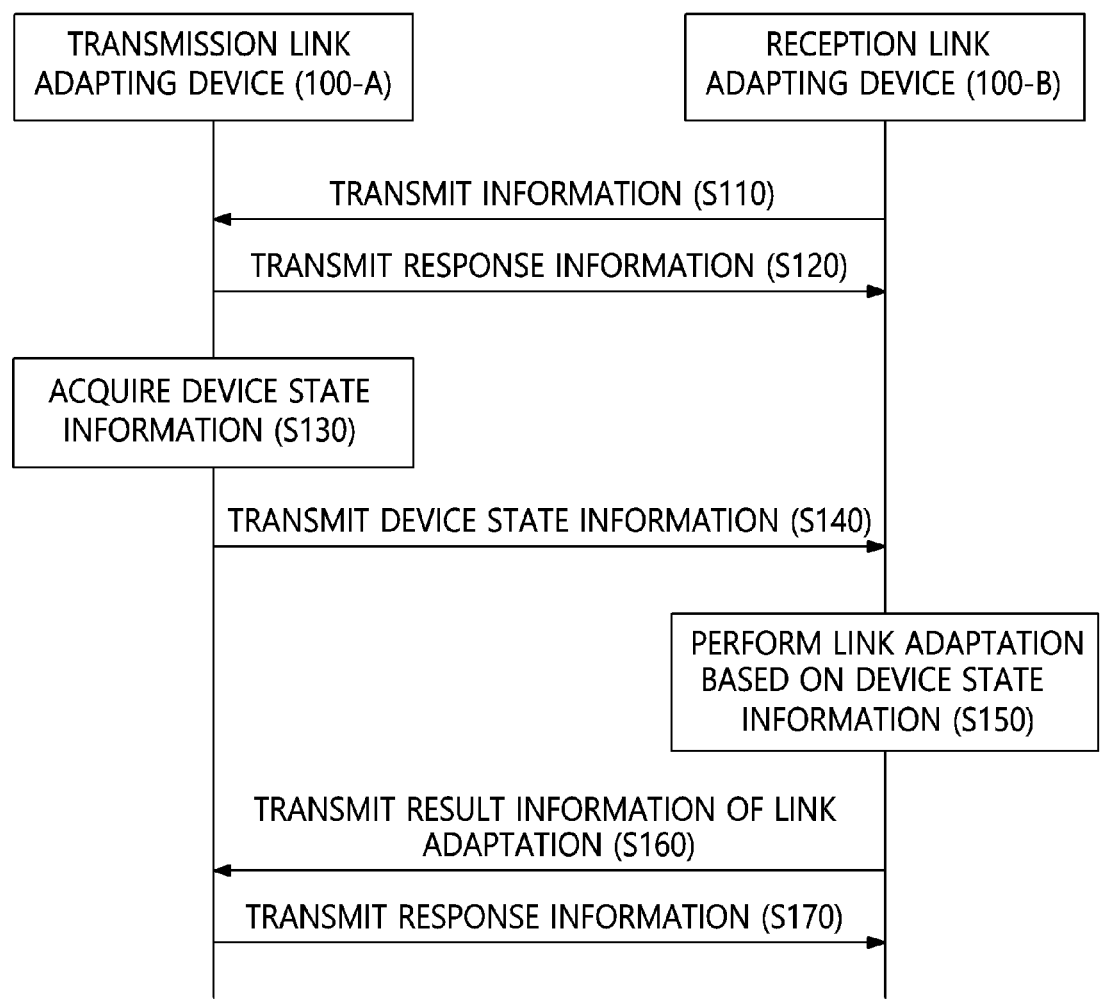
FIG. 5 is a flowchart for explaining an example of a link adapting method of a V2X communication system according to an exemplary embodiment of the present disclosure.

FIG. 5 is a flowchart for explaining an example of a link adapting method of a V2X communication system according to an exemplary embodiment of the present disclosure.

When the transmission link adapting device 100-A is a device such as a vehicle 13 or a pedestrian 14 and the reception link adapting device 100-B is a device such as a road side unit (RSU) 12, a vehicle 13, or a pedestrian 14, the transmission link adapting device 100-A and the reception link adapting device 100-B may exchange a V2X message via a device-to-device direct communication interface. In the meantime, when the transmission link adapting device 100-A is a device such as a vehicle 13 or a pedestrian 14 and the reception link adapting device 100-B is a network such as a base station 11, the transmission link adapting device 100-A and the reception link adapting device 100-B may exchange a V2X message via a device-to-network communication interface.

Referring to FIG. 5, the processor 110 of the reception link adapting device 100-B transmits information to the transmission link adapting device 100-A in step S110.

By doing this, the processor 100 of the transmission link adapting device 100-A transmits response information about the information received from the reception link adapting device 100-B to the reception link adapting device 100-B in step S120.

Here, the response information may be an automatic repeat request (ARQ) response signal or a hybrid automatic repeat request (HARQ) response signal. The automatic repeat request (ARQ) refers that if there is no error as an error inspection result of received information (when ACK is received), the process is continued and if NACK is received or it is time out, data is retransmitted from a point when the error occurs. The hybrid automatic repeat request (HARQ) refers to a method that forward error control and the automatic repeat request (ARQ) are mixed.

Thereafter, the processor 110 of the transmission link adapting device 100-A acquires device state information in step S130.

Here, the device state information includes first state information for checking a state change of a wireless channel and second state information checking a moving speed of the device.

The first state information may be reception signal to noise ratio (SNR) which is affected by a state change of the wireless channel.

The second state information is movement speed related data of the device and may be movement speed data and data used to acquire a movement speed. For example, data used to acquire a movement speed may include device location information and a reference signal to measure Doppler shift.

At this time, when the reception link adapting device 100-B is a network such as a base station 11, the transmission link adapting device 100-A transmits cell ID measurement request information to the reception link adapting device 100-B to calculate its own location. By doing this, the reception link adapting device 100-B transmits response information about whether the cell ID is measurable (it is possible to measure the cell ID or it is not possible to measure the cell ID) to the transmission link adapting device 100-A. Further, the reception link adaption device 100-B transmits the cell ID measurement result information to the transmission link adapting device 100-A. At this time, when the reception link adapting device 100-B receives the measurement result request information from the transmission link adapting device 100-A, the reception link adapting device 100-B transmits the cell ID measurement result information to the transmission link adapting device 100-A. The reception link adaption device 100-B periodically transmits the cell ID measurement result information to the transmission link adapting device 100-A. In this case, when the reception link adapting device 100-B periodically receives the cell ID measurement result transmission request information from the transmission link adapting device 100-A, the reception link adapting device 100-B periodically transmits the cell ID measurement result information to the transmission link adapting device 100-A from then.

Further, the transmission link adapting device 100-A transmits arrival time difference information (OTDOA) request information to the reception link adapting device 100-B to calculate its own location. Further, the reception link adaption device 100-B transmit the response information including the arrival time difference information (OTDOA) to the transmission link adapting device 100-A.

Further, the transmission link adapting device 100-A transmits location information request information to the reception link adapting device 100-B to calculate its own location. By doing this, the reception link adapting device 100-B transmits response information about whether the location information is measurable (it is possible to measure the location information or it is not possible to measure the location information) to the transmission link adapting device 100-A. In addition, the reception link adaption device 100-B transmits the location information measurement result information to the transmission link adapting device 100-A. At this time, when the reception link adapting device 100-B receives the measurement result request information from the transmission link adapting device 100-A, the reception link adapting device 100-B transmits the location information measurement result information to the transmission link adapting device 100-A. The reception link adaption device 100-B periodically transmits the location information measurement result information to the transmission link adapting device 100-A. In this case, when the reception link adapting device 100-B periodically receives the location information measurement result transmission request information from the transmission link adapting device 100-A, the reception link adapting device 100-B periodically transmits the location information measurement result information to the transmission link adapting device 100-A from then.

By doing this, the transmission link adapting device 100-A acquires its own location information using response information including cell ID measurement result information and arrival time difference information (OTDOA), and location information measurement result information.

The processor 110 of the transmission link adapting device 100-A may acquire its own location information using a global positioning system (GPS) module mounted in the transmission link adapting device 100-A.

Thereafter, the processor 110 of the transmission link adapting device 100-A transmits device state information to the reception link adapting device 100-B in step S140.

For example, the processor 100 of the transmission link adapting device 100-A periodically transmits device state information to allow the reception link adapting device 100-B to perform appropriate link adaptation. At this time, the processor 110 of the transmission link adapting device 100-A quantizes the first state information of the device state information to a channel quality indicator (CQI) to transmit the quantized first state information to the reception link adapting device 100-B. The transmission link adapting device 100-A also transmits the first state information to the reception link adapting device 100-B, as channel state information (CSI), using a physical uplink shared channel (PUSCH), physical uplink control channel (PUCCH). Here, the channel state information CSI includes a channel quality indicator (CQI) and a rank indicator (RI).

By doing this, the processor 100 of the reception link adapting device 100-B performs the link adaptation based on the device state information received from the transmission link adapting device 100-A in step S150.

That is, in a wireless channel used in a wireless communication system, an attenuation of radio waves varies according to a distance between a base station and a terminal and a shadowing effect. In order to increase a throughput of the wireless channel by adjusting a modulation and coding scheme (MCS) level in accordance with the change of the reception SNR according to the state of the wireless channel, the processor 110 of the reception link adapting device 100-B adjusts an MCS level based on the device state information to perform the link adaptation. At this time, the processor 110 of the reception link adapting device 100-B acquires an MCS level which satisfies a predetermined target block error rate (BLER) based on the device state information to perform the link adaptation.

For example, as the reception SNR of the wireless channel, that is, the first state information is large, the processor 110 of the reception link adapting device 100-B increases a data transfer rate using a higher MCS level (a higher modulation scheme and a higher coding rate) and as the reception SNR of the wireless channel, that is, the first state information is low, ensures the reliability using a lower MCS level (a lower modulation scheme and a low coding rate) rather than lowering the spectral efficiency. That is, the processor 110 of the reception link adapting device 100-B acquires a state value (effective SNR) of a current wireless channel based on the first state information (reception SNR) received from the transmission link adapting device 100-A and acquires the highest MCS level which may satisfy the target block error rate (BLER) criterion at the acquired state value (effective SNR).

At this time, the processor 110 of the reception link adapting device 100-B acquires a more accurate state value (effective SNR) additionally using the second state information (movement speed related data). The part of acquiring a more accurate state value (effective SNR) using second state information (movement speed related data) will be described in more detail below.

Next, the processor 110 of the reception link adapting device 100-B transmits result information of the link adaptation to the transmission link adapting device 100-A in step S160.

Here, the result information of the link adaptation may include information about modulation and coding format.

By doing this, the processor 100 of the transmission link adapting device 100-A transmits response information about the result information received from the reception link adapting device 100-B to the reception link adapting device 100-B in step S170.

Here, the response information may be an automatic repeat request (ARQ) response signal or a hybrid automatic repeat request (HARQ) response signal.

In the meantime, the steps of performing the link adapting method illustrated in FIG. 5 are just one example so that according to the exemplary embodiment, orders of some steps are changed or some steps may be simultaneously performed.

Now, an example of a link adapting method for a V2X communication system according to an exemplary embodiment of the present disclosure will be described with reference to FIG. 6.

Figure 6:
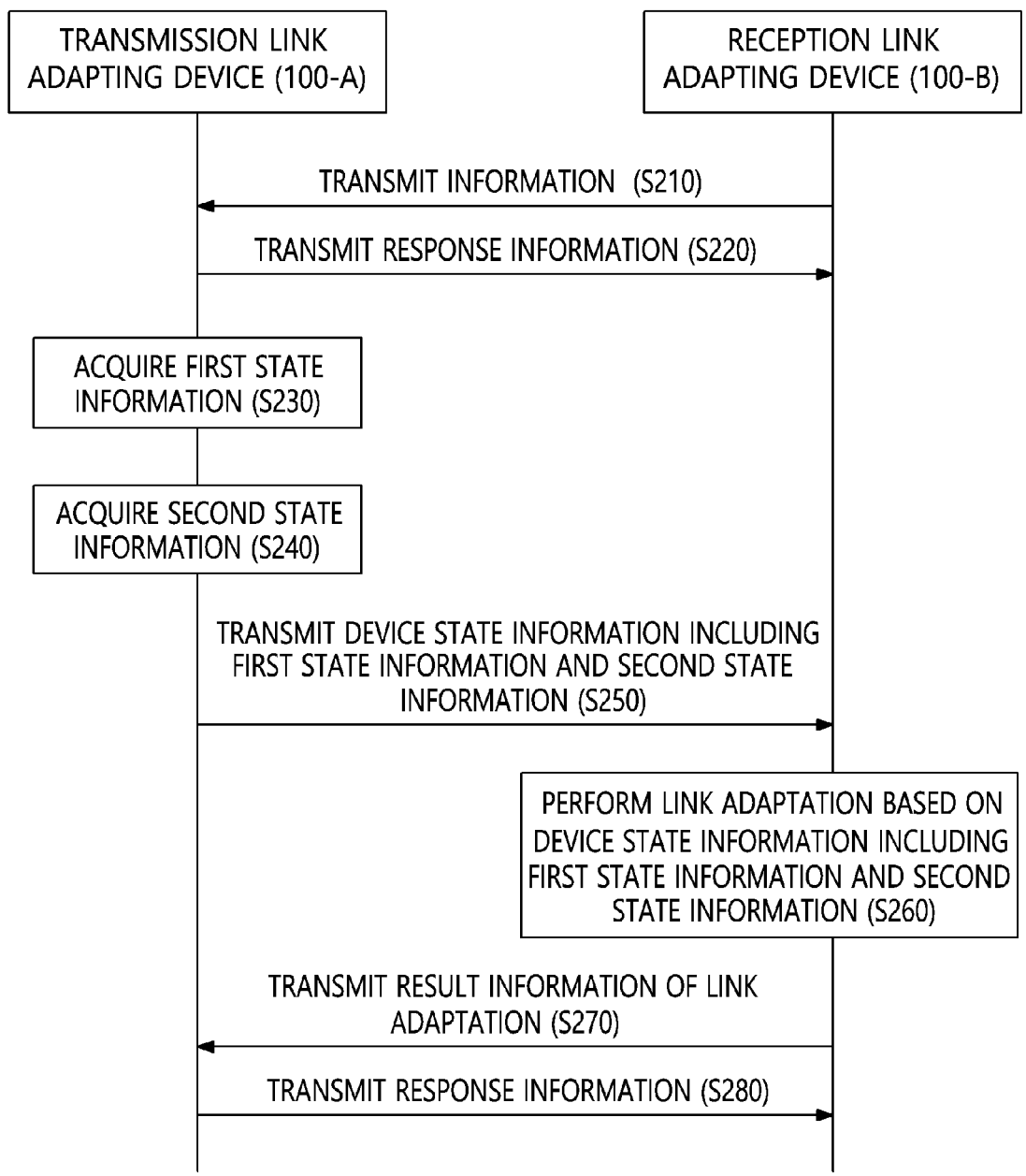
FIG. 6 is a flowchart for explaining an example of a link adapting method illustrated in FIG. 5.

FIG. 6 is a flowchart for explaining an example of a link adapting method illustrated in FIG. 5.

Referring to FIG. 6, the processor 110 of the reception link adapting device 100-B transmits information to the transmission link adapting device 100-A in step S210.

By doing this, the processor 100 of the transmission link adapting device 100-A transmits response information about the information received from the reception link adapting device 100-B to the reception link adapting device 100-B in step S220.

Here, the response information may be an automatic repeat request (ARQ) response signal or a hybrid automatic repeat request (HARQ) response signal.

Thereafter, the processor 110 of the transmission link adapting device 100-A acquires the first state information in step S230.

Here, the first state information refers to information for checking state change of the wireless channel. The first state information may be reception SNR which is affected by a state change of the wireless channel.

The processor 110 of the transmission link adapting device 100-A acquires second state information in step S240.

Here, the second state information refers to information for checking a movement speed of the device. The second state information is movement speed related data of the device and may be movement speed data and data used to acquire a movement speed.

Thereafter, the processor 110 of the transmission link adapting device 100-A transmits device state information including the first state information and the second state information to the reception link adapting device 100-B in step S250.

For example, the processor 100 of the transmission link adapting device 100-A periodically transmits device state information to allow the reception link adapting device 100-B to perform appropriate link adaptation.

By doing this, the processor 100 of the reception link adapting device 100-B performs the link adaptation based on the device state information (including the first state information and the second state information) received from the reception link adapting device 100-B in step S260.

At this time, the processor 110 of the reception link adapting device 100-B acquires an MCS level which satisfies a predetermined target block error rate (BLER) based on the device state information to perform the link adaptation.

That is, the processor 110 of the reception link adapting device 100-B acquires a state value (effective SNR) of a current wireless channel based on the first state information (reception SNR) received from the transmission link adapting device 100-A and acquires the highest MCS level which may satisfy the target block error rate (BLER) at the acquired state value (effective SNR).

At this time, the processor 110 of the reception link adapting device 100-B acquires more accurate state value (effective SNR) additionally using the second state information (movement speed related data). The part of acquiring a more accurate state value (effective SNR) using second state information (movement speed related data) will be described in more detail below.

Next, the processor 110 of the reception link adapting device 100-B transmits result information of the link adaptation to the transmission link adapting device 100-A in step S270.

Here, the result information of the link adaptation may include information about modulation and coding format.

By doing this, the processor 100 of the transmission link adapting device 100-A transmits response information about the result information received from the reception link adapting device 100-B to the reception link adapting device 100-B in step S280.

Here, the response information may be an automatic repeat request (ARQ) response signal or a hybrid automatic repeat request (HARQ) response signal.

In the meantime, the example of the link adapting method illustrated in FIG. 6 is substantially the same as the link adapting method illustrated in FIG. 5, except for a part of acquiring the first state information and the second state information included in the device state information. In the meantime, the steps of performing the example of the link adapting method illustrated in FIG. 6 are just one example so that according to the exemplary embodiment, orders of some steps are changed or some steps may be simultaneously performed.

Now, another example of a link adapting method for a V2X communication system according to an exemplary embodiment of the present disclosure will be described with reference to FIG. 7.

Figure 7:
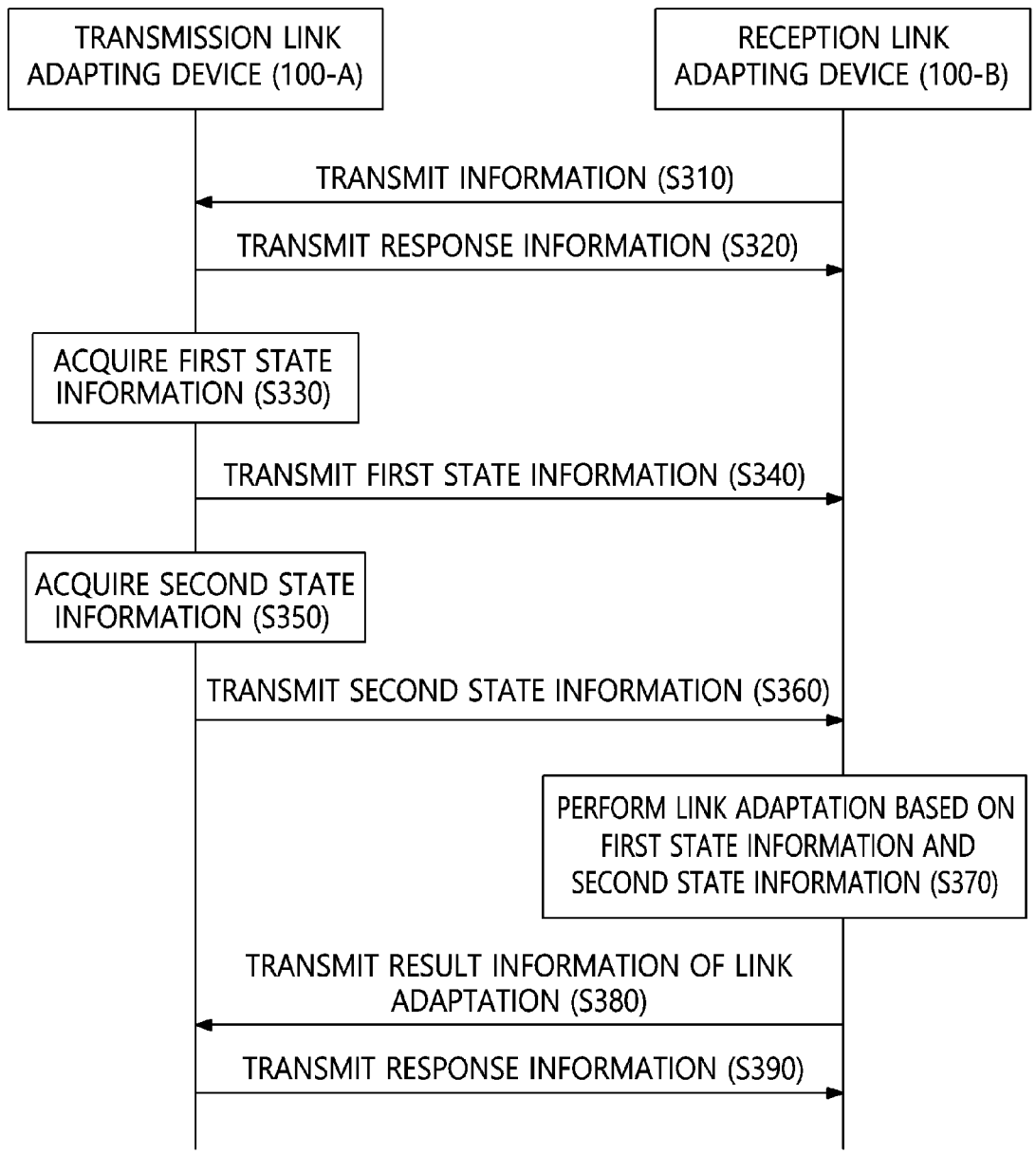
FIG. 7 is a flowchart for explaining another example of a link adapting method illustrated in FIG. 5.

FIG. 7 is a flowchart for explaining another example of a link adapting method illustrated in FIG. 5.

Referring to FIG. 7, the processor 110 of the reception link adapting device 100-B transmits information to the transmission link adapting device 100-A in step S310.

By doing this, the processor 100 of the transmission link adapting device 100-A transmits response information about the information received from the reception link adapting device 100-B to the reception link adapting device 100-B in step S320.

Here, the response information may be an automatic repeat request (ARQ) response signal or a hybrid automatic repeat request (HARQ) response signal.

Thereafter, the processor 110 of the transmission link adapting device 100-A acquires the first state information in step S330.

Here, the first state information refers to information for checking state change of the wireless channel. The first state information may be reception SNR which is affected by a state change of the wireless channel.

Thereafter, the processor 110 of the transmission link adapting device 100-A transmits the first state information to the reception link adapting device 100-B in step S340.

For example, the processor 100 of the transmission link adapting device 100-A periodically transmits the first state information to allow the reception link adapting device 100-B to perform appropriate link adaptation.

The processor 110 of the transmission link adapting device 100-A acquires second state information in step S350.

Here, the second state information refers to information for checking a movement speed of the device. The second state information is movement speed related data of the device and may be movement speed data and data used to acquire a movement speed.

Thereafter, the processor 110 of the transmission link adapting device 100-A transmits the second state information to the reception link adapting device 100-B in step S360.

For example, the processor 100 of the transmission link adapting device 100-A periodically transmits the second state information to allow the reception link adapting device 100-B to perform appropriate link adaptation.

By doing this, the processor 100 of the reception link adapting device 100-B performs the link adaptation based on the first state information and the second state information received from the reception link adapting device 100-B in step S370.

That is, the processor 110 of the reception link adapting device 100-B acquires a state value (effective SNR) of a current wireless channel based on the first state information (reception SNR) received from the transmission link adapting device 100-A and acquires the highest MCS level which may satisfy the target block error rate (BLER) at the acquired state value (effective SNR).

At this time, the processor 110 of the reception link adapting device 100-B acquires more accurate state value (effective SNR) additionally using the second state information (movement speed related data). The part of acquiring a more accurate state value (effective SNR) using second state information (movement speed related data) will be described in more detail below.

Next, the processor 110 of the reception link adapting device 100-B transmits result information of the link adaptation to the transmission link adapting device 100-A in step S380.

Here, the result information of the link adaptation may include information about modulation and coding format.

By doing this, the processor 100 of the transmission link adapting device 100-A transmits response information about the result information received from the reception link adapting device 100-B to the reception link adapting device 100-B in step S390.

Here, the response information may be an automatic repeat request (ARQ) response signal or a hybrid automatic repeat request (HARQ) response signal.

In the meantime, another example of the link adapting method illustrated in FIG. 7 is substantially the same as the example of the link adapting method illustrated in FIG. 5, except for a part of transmitting the first state information and the second state information to the reception link adapting device 100-B. In the meantime, the steps of performing another example of the link adapting method illustrated in FIG. 7 are just one example so that according to the exemplary embodiment, orders of some steps are changed or some steps may be simultaneously performed.

Now, an example of a detailed operation of a step of performing link adaptation according to an exemplary embodiment of the present disclosure will be described with reference to FIG. 8.

The detailed operation of the step of performing link adaptation according to the present disclosure will be described by assuming that the link adapting method according to the present disclosure is performed according to the method illustrated in FIG. 7. The detailed operation of the step of performing link adaptation according to the present disclosure to be described below will be applied to the method illustrated in FIG. 6 in the same way.

Figure 8:
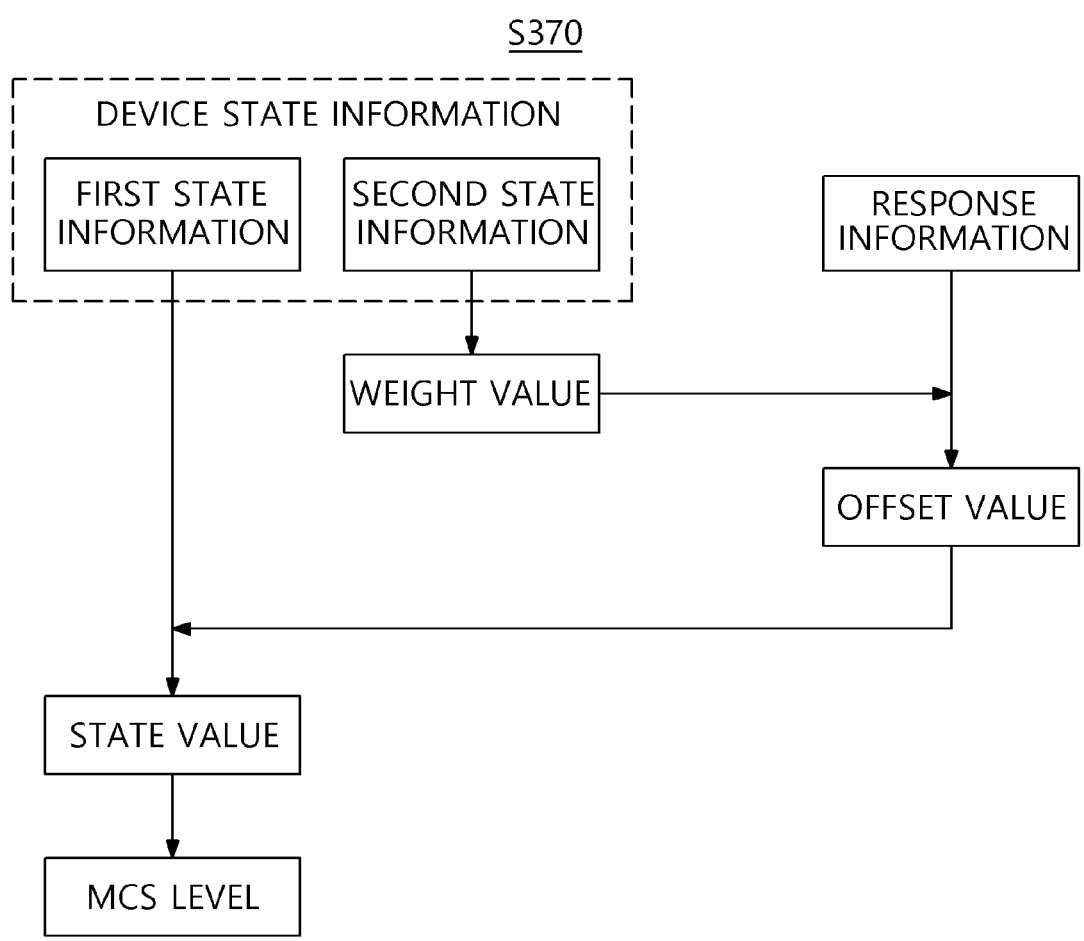
FIG. 8 is a view for explaining an example of a detailed operation of a link adapting step illustrated in FIG. 7.

FIG. 8 is a view for explaining an example of a detailed operation of a link adapting step illustrated in FIG. 7; and Referring to FIG. 8, the processor 100 of the reception link adapting device 100-B acquires a state value based on first state information of the device state information received from the reception link adapting device 100-B.

The processor 110 of the reception link adapting device 100-B acquires an MCS level based on the state value.

That is, the processor 110 of the reception link adapting device 100-B acquires an MCS level which satisfies a predetermined target block error rate (BLER) from the state value acquired based on the device state information.

Here, the processor 100 of the reception link adapting device 100-B performs an offset value based on the response information received from the transmission link adapting device 100-A and acquires the state value using the acquired offset value.

That is, during the process of performing link adaptation, there may be an estimation error between the first state information (reception SNR) and the state value (effective SNR). A cause of the estimation error includes a bias caused during a signaling process, such as a quantization error generated during the quantizing process of the first state information (reception SNR) in the transmission link adapting device 100-A and fluctuation of the first state information (reception SNR) by the movement of the transmission link adapting device 100-A generated between report periods of the first state information (reception SNR).

In order to compensate therefor, the processor 110 of the reception link adapting device 100-B acquires the state value using the offset value acquired based on the response information. That is, the processor 110 of the reception link adapting device 100-B acquires the state value (effective SNR) by adding the offset value to the estimation value (estimation SNR) acquired based on the first state information (reception SNR) as represented in the following Equation 1. Here, when the processor 110 of the reception link adapting device 100-B receives the response information from the transmission link adapting device 100-A, the processor 110 updates the offset value as represented in the following Equation 2.

$$SNR_{eff} = SNR_{est} + \Delta_{offset} \qquad \text{[Equation 1]}$$

$$\Delta_{offset} = \begin{cases} \Delta_{offset} + \Delta_{ACK} & \text{if response information} = ACK \\ \Delta_{offset} + \Delta_{NACK} & \text{if response information} = NACK \end{cases} \qquad \text{[Equation 2]}$$

Here, $SNR_{eff}$ refers to a state value used to acquire the MCS level. $SNR_{est}$ refers to an estimation value acquired based on the first state information. $\Delta_{offset}$ refers to an offset value used to correct the state value. $\Delta_{ACK}$ refers to an offset value step size when the response information is received. $\Delta_{NACK}$ refers to an offset value step size when the NACK response information is received. At this time, a relationship equation as represented in Equation 3 is established between $\Delta_{ACK}$ and $\Delta_{NACK}$.

$$\frac{\Delta_{NACK}}{\Delta_{ACK}} = \frac{1 - BLER_T}{BLER_T} \qquad \text{[Equation 3]}$$

Here, $BLER_T$ indicates a target block error rate BLER.

At this time, the processor 110 of the reception link adapting device 100-B acquires a weight value based on the second state information of the device state information and acquires an offset value using the acquired weight value.

That is, the processor 110 of the reception link adapting device 100-B acquires a more accurate state value (effective SNR) by changing the offset value additionally using the second state information (movement speed related data). The processor 110 of the reception link adapting device 100-B changes the offset value as represented in the following Equation 4 using the weight value acquired based on the second state information (movement speed related data).

$$\Delta_{ACK} = W_{vehicle} \cdot BLER_T$$

$$\Delta_{NACK} = W_{vehicle} \cdot (1 - BLER_T) \qquad \text{[Equation 4]}$$

$\Delta_{NACK}$ refers to an offset value step size when the NACK response information is received. $\Delta_{NACK}$ refers to an offset value step size when the NACK response information is received. $W_{vehicle}$ indicates a weight value acquired based on the second state information (movement speed related data). $BLER_T$ indicates a target block error rate BLER.

At this time, when the second state information is "movement speed data", the processor 110 of the second link adapting device 100-B acquires the second state information, that is, the movement speed data as device movement speed information and acquires the weight value using device movement speed information, that is, "movement speed data" based on a predetermined weight table for every speed. For example, the processor 110 of the reception link adapting device 100-B may acquire a weight value corresponding to the device movement speed information, that is, the "movement speed data" from the weight table for every speed as represented in the following Table 1.

TABLE 1

| Speed (km/h) | Weight value |
|---|---|
| 0 to 40 | 0.1 |
| 40 to 60 | 0.2 |
| 60 to 80 | 0.3 |
| 80 to 180 | 0.5 |
| 180 to 250 | 0.6 |

Table 1 is just an example so that a speed section or a weight value corresponding to the speed section may vary.

Further, the weight table for every speed may be set for every type of device (in the case of the vehicle a type of a transportation unit or a pedestrian) and the second state information received from the transmission link adapting device 100-A may further include device type information. In this case, the processor 110 of the reception link adapting device 100-B acquires a corresponding weight table for every speed using the device type information of the second state information and acquires a weight value using "movement speed data" of the second state information based on the acquired weight table for every speed.

The processor 110 of the reception link adapting device 100-B may acquire a weight value using device movement speed information, that is, "movement speed data" based on a predetermined maximum speed. For example, when the maximum speed is set to "250 km/h" and the device movement speed information, that is, the movement speed data" is "100 km/h", the processor 110 of the reception link adapting device 100-B divides the device movement speed information of "100 km/h" by the predetermined maximum speed "250 km/h" and acquires the division result "0.4" as a weight value. The acquisition of the weight value as described is just an example so that the weight value may be acquired by various methods using the predetermined maximum speed according to the exemplary embodiment. Further, the maximum speed may be set for every type of device (in the case of the vehicle a type of a transportation unit or a pedestrian) and the second state information received from the transmission link adapting device 100-A may further include device type information. In this case, the processor 110 of the reception link adapting device 100-B acquires a corresponding maximum speed using the device type information of the second state information and acquires a weight value using "movement speed data" of the second state information based on the acquired maximum speed.

In the meantime, the processor 100 of the reception link adapting device 100-B acquires a state value (effective SNR) based on the first state information and the second state information which is most recently received from the reception link adapting device 100-B.

That is, the processor 110 of the reception link adapting device 100-B may perform the link adaptation by a process of acquiring an estimation value (estimation SNR) based on the first state information (reception SNR) most recently received from the transmission link adapting device 100-A, a process of acquiring an offset value based on response information most recently received from the transmission link adapting device 100-A, a process of acquiring a weight value based on second state information (movement speed related data) most recently received from the transmission link adapting device 100-B, a process of changing the offset value using the weight value, and a process of acquiring a state value (effective SNR) using the offset value changed using the weight value and the estimation value (estimation SNR).

The processor 100 of the reception link adapting device 100-B acquires the estimation value (estimation SNR) whenever the first state information (reception SNR) is received from the transmission link adapting device 100-A to update the estimation value (estimation SNR), acquires the offset value whenever the response information is received from the transmission link adapting device 100-A to update the offset value, and acquires the weight value whenever the second state information (movement speed related data) is received from the transmission link adapting device 100-A to update the weight value. When the link adaptation needs to be performed, the processor 100 of the reception link adapting device 100-B may perform the link adaptation by the process of changing the updated offset value using the updated weight value and the process of acquiring the state value (effective SNR) using the changed offset value and the updated estimation value (estimation SNR).

Now, another example of a detailed operation of a step of performing link adaptation according to an exemplary embodiment of the present disclosure will be described with reference to FIG. 9.

Figure 9:
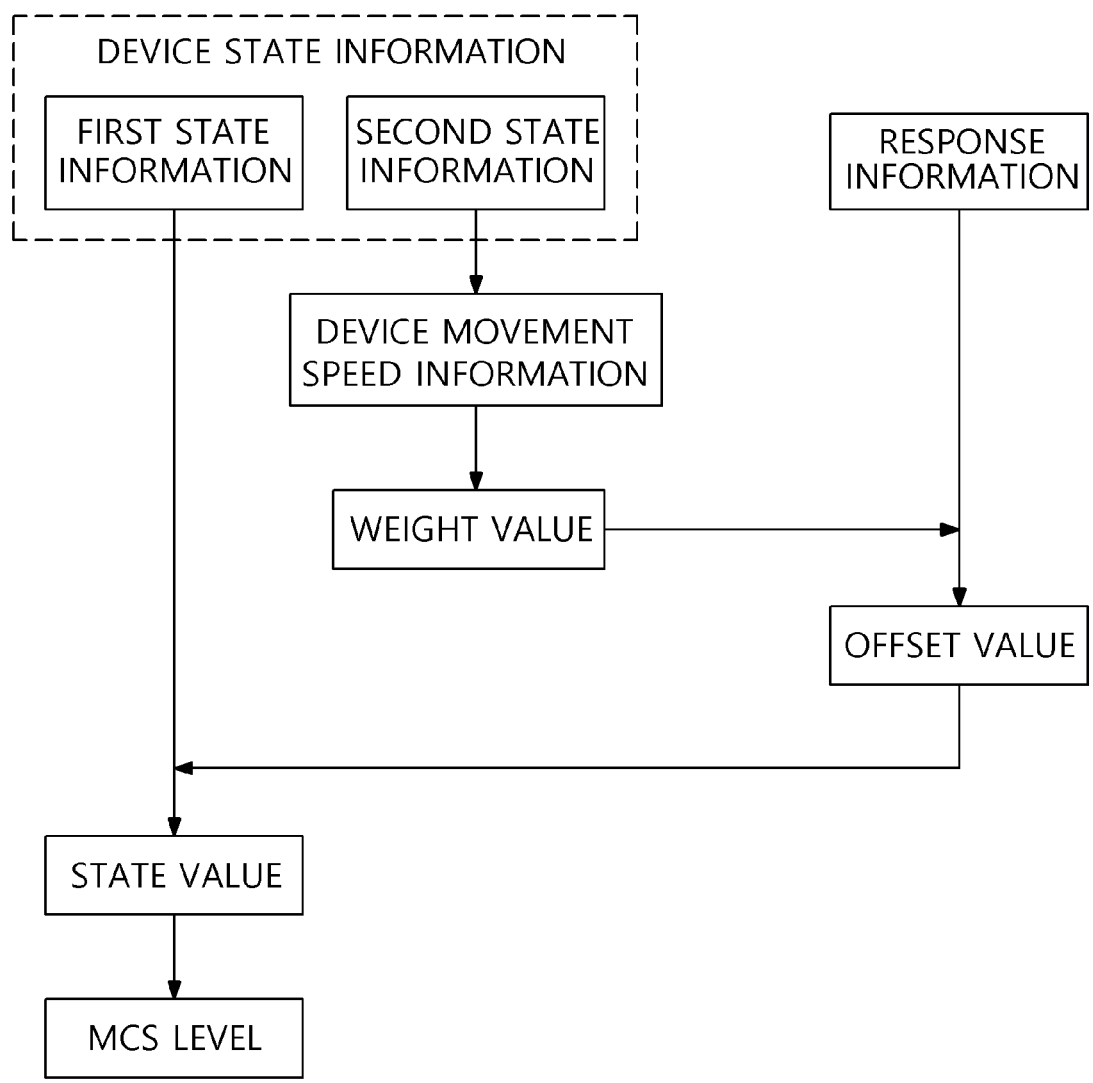
FIG. 9 is a view for explaining another example of a detailed operation of a link adapting step illustrated in FIG. 7.

FIG. 9 is a view for explaining another example of a detailed operation of a link adapting step illustrated in FIG. 7.

Referring to FIG. 9, the processor 100 of the reception link adapting device 100-B acquires a state value based on first state information of the device state information received from the reception link adapting device 100-B.

The processor 110 of the reception link adapting device 100-B acquires an MCS level based on the state value.

Here, the processor 100 of the reception link adapting device 100-B acquires an offset value based on the response information received from the transmission link adapting device 100-A and acquires the state value using the acquired offset value.

That is, the processor 110 of the reception link adapting device 100-B acquires the state value (effective SNR) by adding the offset value to the estimation value (estimation SNR) acquired based on the first state information (reception SNR) as represented in the above Equation 1. Here, when the processor 110 of the reception link adapting device 100-B receives the response information from the transmission link adapting device 100-A, the processor 110 updates the offset value as represented in the above Equation 2.

At this time, the processor 110 of the reception link adapting device 100-B acquires device movement speed information based on the second state information of the device state information, acquires a weight value using the acquired device movement speed information, and acquires an offset value using the acquired weight value.

That is, the processor 110 of the reception link adapting device 100-B acquires a more accurate state value (effective SNR) by changing the offset value additionally using the second state information (movement speed related data). The processor 110 of the reception link adapting device 100-B changes the offset value as represented in the above Equation 4 using the weight value acquired based on the second state information (movement speed related data).

At this time, when the second state information is "data used to acquire a movement speed", the processor 100 of the reception link adapting device 100-B may acquire device movement speed information based on the second state information. For example, the processor 110 of the reception link adapting device 100-B may acquire device movement speed information of the transmission link adapting device 100-A using the second state information (location information of the device or a reference signal to measure Doppler shift).

The processor 110 of the reception link adapting device 100-B acquires the weight value using device movement speed information acquired by means of the second state information based on the predetermined weight table for every speed. For example, the processor 110 of the reception link adapting device 100-B may acquire a weight value corresponding to the device movement speed information from the weight table for every speed as represented in the above Table 1. Table 1 is just an example so that a speed section or a weight value corresponding to the speed section may vary. Further, the weight table for every speed may set for every type of device (in the case of the vehicle a type of a transportation unit or a pedestrian) and the second state information received from the transmission link adapting device 100-A may further include device type information. In this case, the processor 110 of the reception link adapting device 100-B acquires a corresponding weight table for every speed using the device type information of the second state information and acquires a weight value using device movement speed information based on the acquired weight table for every speed.

The processor 110 of the reception link adapting device 100-B acquires the weight value using device movement speed information acquired by means of the second state information based on the predetermined maximum speed. For example, when the maximum speed is set to "250 km/h" and the device movement speed information is "150 km/h", the processor 110 of the reception link adapting device 100-B divides the device movement speed information of "150 km/h" by the predetermined maximum speed "250 km/h" and acquires the division result "0.6" as a weight value. The acquisition of the weight value as described is just an example so that the weight value may be acquired by various methods using the predetermined maximum speed according to the exemplary embodiment. Further, the maximum speed may be set for every type of device (in the case of the vehicle a type of a transportation unit or a pedestrian) and the second state information received from the transmission link adapting device 100-A may further include device type information. In this case, the processor 110 of the reception link adapting device 100-B acquires a corresponding maximum speed using the device type information of the second state information and acquires a weight value using the device movement speed information based on the maximum speed.

In the meantime, another example of the detailed operation of the link adaptation performing step illustrated in FIG. 9 is substantially the same as an example of the detailed operation of the link adaptation performing step illustrated in FIG. 8 except that the device movement speed information is acquired based on second state information (data used to acquire a movement speed).

Performance of Link Adaptation According to Present Disclosure

According to the present disclosure, an appropriate parameter value may be acquired to efficiently perform link adaptation in the V2X communication system. That is, according to the present disclosure, a more accurate state value (effective SNR) may be acquired by changing the offset value additionally using the second state information (movement speed related data). By doing this, according to the present disclosure, an average data transfer rate may be improved. Further, according to the present disclosure, it is possible to build a V2X communication system which adaptively operates in accordance with the state of the device by determining an MCS level based on a state value (an effective SNR) acquired in consideration of a moving speed of the device.

When a weight value between 0.1 to 1.0 is used based on Equations 1, 2, and 4, an experiment result representing an average data transfer rate (unit is Mbps) which may be obtained according to the movement speed of the vehicle 13 is as represented in the following Table 2. The bold values indicate weight values $W_{vehicle}$ at which a maximum average data transfer rate performance may be obtained at every movement speed.

TABLE 2

| Movement speed (km/h) | Weight value ($W_{vehicle}$) | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| 0 | 103.81 | 102.99 | 102.48 | 102.31 | 102.27 | 102.12 | 102.07 | 102.00 | 101.96 | 101.96 |
| 20 | 103.17 | 102.42 | 102.17 | 101.92 | 101.84 | 101.64 | 101.56 | 101.53 | 101.54 | 101.47 |
| 40 | 101.72 | 101.62 | 101.37 | 101.18 | 101.19 | 101.01 | 100.94 | 100.80 | 100.81 | 100.84 |
| 60 | 101.41 | 101.59 | 101.40 | 101.17 | 101.10 | 100.87 | 100.81 | 100.70 | 100.60 | 100.63 |
| 80 | 101.17 | 101.45 | 101.48 | 101.31 | 101.24 | 101.08 | 100.95 | 100.92 | 100.94 | 100.86 |
| 100 | 99.90 | 100.53 | 100.62 | 100.55 | 100.56 | 100.39 | 100.32 | 100.18 | 100.18 | 100.12 |
| 120 | 97.83 | 98.60 | 98.83 | 98.80 | 98.91 | 98.71 | 98.62 | 98.64 | 98.57 | 98.54 |
| 140 | 98.11 | 99.14 | 99.36 | 99.39 | 99.43 | 99.29 | 99.27 | 99.24 | 99.20 | 99.14 |
| 160 | 96.14 | 97.27 | 97.50 | 97.66 | 97.74 | 97.70 | 97.56 | 97.56 | 97.51 | 97.54 |
| 180 | 93.33 | 94.76 | 95.09 | 95.35 | 95.52 | 95.39 | 95.33 | 95.34 | 95.28 | 95.32 |
| 200 | 92.97 | 94.69 | 95.00 | 95.22 | 95.40 | 95.44 | 95.44 | 95.32 | 95.29 | 95.38 |
| 250 | 87.73 | 89.84 | 90.44 | 90.76 | 90.97 | 91.01 | 90.99 | 90.95 | 90.90 | 91.01 |

Table 2 represents a result of an experiment performed in the following simulation parameter setting environment.
Number of transmission antennas: 8
Number of reception antennas: 2
Number of layers: 2
Bandwidth: 20 MHz
Number of physical resource blocks: 51
Subcarrier spacing: 30 kHz
CSI reporting periodicity: 320 slots (160 ms)
Reported SNR: 2 dB
Channel model: CDL-D
Target BLER: 0.1
ACK step size: 0.1 dB
NACK step size: 0.9 dB According to still another exemplary embodiment of the present disclosure, the link adapting method of a V2X communication system of the present disclosure is for a link adaptation process between an autonomous vehicle (or a semi-autonomous vehicle) and a surrounding vehicle or a link adaptation process between the autonomous vehicle (or a semi-autonomous vehicle) and a roadside base station around the vehicle. The link adaptation technique of the present disclosure is a technique for adaptively adjusting a link with a vehicle and a roadside base station according to a movement situation of a vehicle, specifically, semi-autonomous driving and autonomous driving vehicles. In terms of average performance, the weighting factor shows different performance depending on a (relative) movement speed of the vehicle. To be more specific, at a low speed section (40 km/h or lower), even though the weighting factor is low (for example, 0.05 to 0.15), a sufficient performance may be shown. Next, at an intermediate speed section (40 km/h to 80 km/h), the higher the speed, the larger the weighting factor. For example, at the speed 60 km/h, the weighting factor is desirably 0.15 to 0.25 and at the speed 80 km/h, the weighting factor is desirably 0.25 to 0.35. In a high speed section (80 km/h), the weighting factor is desirably 0.4 to 0.7. When the speed exceeds 200 km/h, it was found that the improvement of the performance was not significant even with a higher weighting factor.

In the case of a vehicle which is autonomously moving, in a constant driving mode or a low external traffic threat level, the weighting factor at a later time may be predicted based on the current weighting factor (unless there is a separate variable, it may be treated the same. However, in a situation in which the driving uncertainty is increased during the autonomous driving process such as a driving section in which rapid acceleration or rapid deceleration is predicted or a sharp curve, the weighting factor may be predicted to be applied according to the determined situation. For example, when the rapid acceleration occurs, the weighting factor in the later time is predicted to be increased and when the rapid deceleration occurs, the weighting factor is predicted to be decreased and the prediction is applied in advance to improve the efficiency in the communication link adaptation. In a situation in which the weighting factor needs to be fixed, even in a situation in which the acceleration is requested, the autonomous vehicle maintains a low acceleration or controls a speed so as not to accelerate over a predetermine speed, or changes a driving route control of the vehicle. That is, if a determined communication performance is satisfied and the speed range of the vehicle is determined according to a range of the determined weight factor, the autonomous vehicle searches an available current route in the speed range and drives along the searched route. If the vehicle is not an autonomous vehicle, the route information may be provided as a recommending route through a navigation screen.

The link adapting method of the present disclosure may be individually or selectively performed by a processor mounted in the vehicle or a processor of the roadside base station installed in the vicinity of the road. When only the processor of the roadside base station performs this link adaptation, the roadside base station may be implemented to transmit a link adaptation result according to the link adaptation result to a terminal mounted in the vehicle and the vehicle performs the link adaptation according to the received link adaptation result.

Further, the link adapting method of the present disclosure is not limited only to a vehicle to vehicle and a vehicle to roadside base station. When the link adaptation is implemented to be performed between the vehicle and a pedestrian who carries a mobile communication terminal, the same principle may be applied.

The operation according to the exemplary embodiment of the present disclosure may be implemented as a program instruction which may be executed by various computers to be recorded in a computer readable storage medium. The computer readable storage medium indicates an arbitrary medium which participates to provide a command to a processor for execution. The computer readable storage medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A link adapting method of V2X communication system performed by a link adapting device which performs link adaptation based on information received from another link adapting device which is a communication target, the method comprising:
receiving device state information from another link adapting device; and
performing link adaptation with the other link adapting device based on the device state information,
wherein the link adaptation is performed by:
adjusting a modulation and coding scheme (MCS) based on the device state information, and
acquiring the MCS level which satisfies a predetermined target block error rate (BLER) from a state value acquired based on the device state information,
wherein in the performing of link adaptation:
the state value is acquired using an offset value acquired based on response information received from the link adapting device which is the communication target,
the offset value is acquired using a weight value acquired based on the device state information,
device movement speed information is acquired based on the device state information and the weight value is acquired using the device movement speed information, and
the weight value is acquired using the device movement speed information based on a predetermined maximum speed.

2. The link adapting method according to claim 1, wherein the link adapting method is performed by a processor mounted in a first vehicle, the other link adapting device is a second vehicle or a roadside base station terminal which is located in the vicinity of the first vehicle, the device state information includes relative movement information according to relation motion between the first vehicle and the second vehicle or the load side base station terminal, and the link adaption is performed to determine a step size to adjust a level of a modulation and coding scheme (MCS) for link adaptation using the relative movement information.

3. The link adapting method according to claim 1, wherein the performing of link adaptation, the weight value is acquired using device movement speed information based on a predetermined weight table for every speed.

4. A link adapting device which performs link adaptation based on information received from another link adapting device which is a communication target, the link adapting device comprising:
a RF transceiver which transmits/receives a RF signal;
a memory which stores one or more programs to perform the link adaptation; and
one or more processors which perform an operation for the link adaptation according to one or more programs stored in the memory, wherein the processor receives device state information from another link adapting device by means of the RF transceiver and performs link adaptation with the other link adapting device based on the device state information wherein the link adaptation is performed by:
- adjusting a modulation and coding scheme (MCS) based on the device state information, and
- acquiring the MCS level which satisfies a predetermined target block error rate (BLER) from a state value acquired based on the device state information, wherein in the performing of link adaptation:
- the state value is acquired using an offset value acquired based on response information received from the link adapting device which is the communication target,
- the offset value is acquired using a weight value acquired based on the device state information,
- device movement speed information is acquired based on the device state information and the weight value is acquired using the device movement speed information, and
- the weight value is acquired using the device movement speed information based on a predetermined maximum speed.

* * * * *